United States Patent Office 2,872,482
Patented Feb. 3, 1959

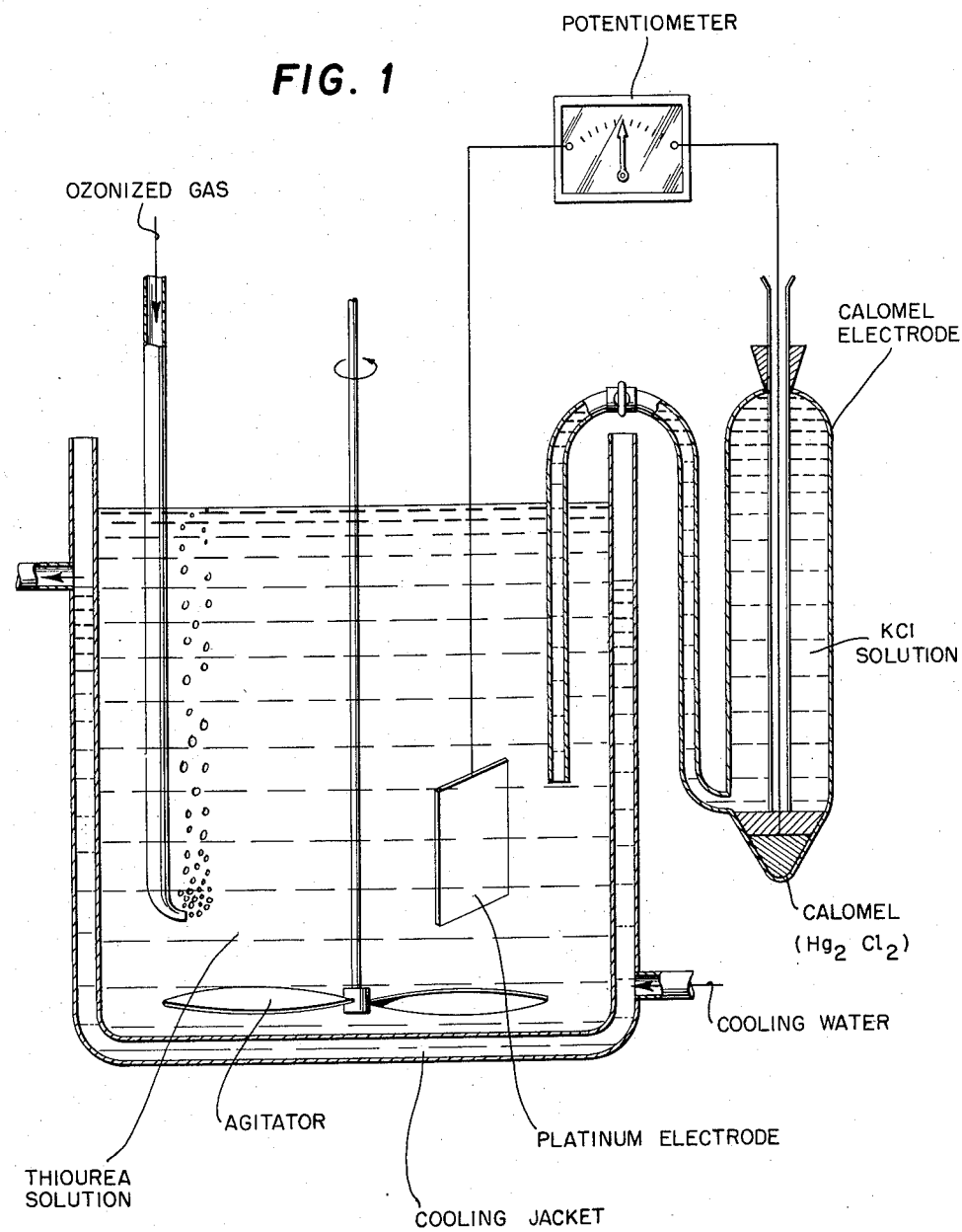

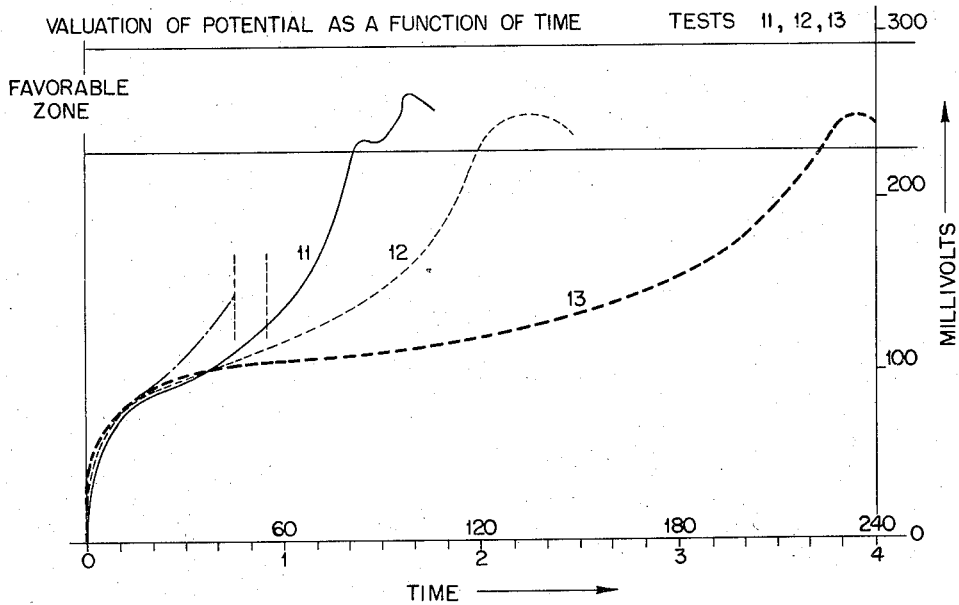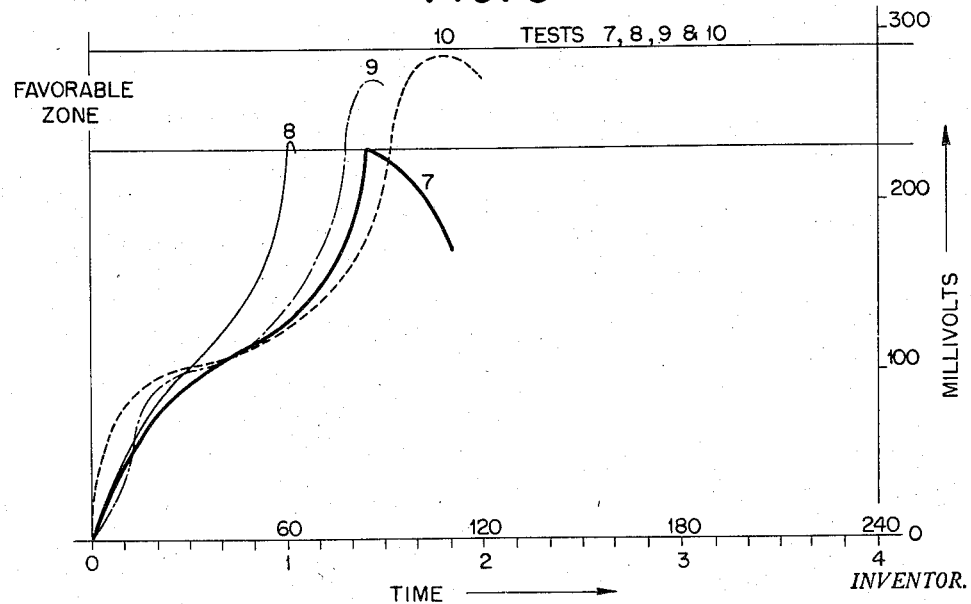

2,872,482

PROCESS OF MAKING THIOUREA DIOXIDE

Marguerite Emma Marie Josèphe Provoost, Paris, France, assignor to Société Anonyme des Manufactures des Glaces et Produits Chimiques de Saint-Gobain, Chauny & Cirey, Paris, France Application March 15, 1956, Serial No. 571,651

Claims priority, application France March 16, 1955

5 Claims. (Cl. 260—552)

This invention relates to the manufacture of thiourea dioxide $(NH_2)_2SCO_2$. Thiourea dioxide has heretofore been prepared by the oxidation of thiourea by the use of hydrogen peroxide. That process has the inconvenience that it dilutes the reaction medium, the reaction medium usually being water. It adds that water which is normally present in the commercial solution of hydrogen peroxide and that water which is formed in the reduction of the hydrogen peroxide. That dilution is inevitable and it complicates the attempt to recover the thiourea dioxide, a substance which is somewhat soluble in water, thus notably diminishing the yield of the process.

It is an object of this invention to improve the yield of the process of manufacturing thiourea dioxide. Another object is to avoid the dilution of the reaction medium which is characteristic of the prior art. Yet another object is to make easy a separation of the product from the reaction medium. Another object is to avoid loss of entrained product by reutilization of the reaction medium.

The objects of the invention are accomplished, generally speaking, by reacting thiourea in aqueous or in organic, medium with a gas containing ozone or ozonized air. Both ozone and ozonized air are well known and methods and apparatus exist for their preparation, consequently standard methods of producing ozone and ozonized air will be employed. A satisfactory method of generating the ozone or the ozonized air is to pass air through an ozonizer or an activator as the case may be, and then to bubble the ozonized air or the ozone immediately through the reaction medium containing thiourea.

It is a part of the discovery that to reduce the temperature of the reaction medium improves the yield of thiourea dioxide. Thus, when one carries out the reaction in solution or in aqueous suspension, the best yields are obtained by maintaining the liquid containing the thiourea at temperatures between about $-2°$ and $+20°$ C., preferably between about 0 and about $5°$ C., during the reaction. The yield can be further increased by using an organic solvent, inert to the reactants, which permits one to operate at temperatures lower than $0°$, of which acetone is an example. In such cases the temperatures employed may be carried down to $-10°$ C. with favorable results. With the same object it is equally recommended to cool the oxidizing gas after it issues from the ozonizer or the activator and before it enters the reaction medium. The manufacture may be carried out continuously or in batches. It has been demonstrated that the oxidizing agent has a tendency to decompose the thiourea dioxide shortly after it is formed, particularly because, as the reaction is completed, the thiourea begins to disappear from the reaction medium. It is consequently an object of the invention to maintain in the solution or suspension of thiourea at least that quantity of thiourea which corresponds to the active oxygen introduced, and preferably a slight excess.

In order to produce a good yield, it is recommended that the input of oxidizing gas be high in order to make the oxidation rapid and to prevent the thiourea dioxide from being decomposed in any appreciable amount. In practice one obtains good results by introducing the oxidizing gas into the liquid containing the thiourea with an input corresponding to the introduction of about 1 kg. of ozone per hour for every 10 liters of the reaction mass. In other words, one kg. of ozone per hour should be introduced for about every 10 liters of useful capacity of the receptacle containing liquid. In other cases, the yield may be less.

Due to the fact that neither the oxidation reaction itself, nor the oxidation agent imports water into the reaction medium, the latter is not diluted and arrives at the end of the reaction with the same quantity of water which it had at the beginning. This makes it possible to recover the product by filtration and drying. The thiourea dioxide precipitates from the water medium and the filtrate, which is saturated with thiourea dioxide, can be used in another operation of the same sort after adding a new quantity of thiourea. Thus, the process lends itself to both batch and continuous methods as the thiourea dioxide formed separates itself from the reaction medium integrally. The reaction medium thus becomes a saturated solution of thiourea dioxide.

The reaction may also be carried out in organic liquids which are solvents for thiourea, or in which thiourea may be suspended. In general, it is preferred that the organic liquid shall be to some extent a solvent for the thiourea and a non-solvent for the thiourea dioxide. Under such circumstances the same principles of reaction are employed as have been described in connection with the water medium. The ozonized air or ozone, with or without added inert gases, is bubbled through the reaction medium containing the thiourea, the thiourea in suspension dissolving in the organic reaction medium as fast as the thiourea in solution is precipitated out by reaction with the oxygen.

An important dependent invention concerns the control of the progress of the reaction, which is accomplished in a novel manner. An electrode is immersed in the reaction medium and, with a reference electrode, is connected to an apparatus which will show the potential of the reaction mass. By this means one is able to measure the potential to which the electrode in the reaction mass is carried. If one works by batch methods it is observed that the potential increases regularly, beginning with the start of the reaction, until it reaches a maximum value, thereafter decreasing. The maximum potential corresponds to the maximum yield of the transformation of the thiourea to thiourea dioxide, so that one may terminate the operation as soon as the potential has attained that maximum value and begins to decrease. In this way the decomposition of the reaction product is avoided by termination of the reaction before the decomposition has progressed. In continuous methods of operation, it is equally possible to follow the progress of the reaction by observing the value of the potential and in regulating the input of oxidizing gas and of thiourea so as to maintain the potential constant near its optimum value. Thus, if the potential tends to fall in the reaction chamber, through which the reaction mass is flowing, the input of oxygen or the input of thiourea is changed in order to correct the fall and bring the potential back to an approximation of its maximum.

On the attached diagram is represented the variation of the potential measured during various tests, in aqueous medium. On the abcissae are represented the times in minutes from the beginning of the operation and on the ordinates are represented the potential in millivolts.

It can be seen that in each case the potential attains a maximum value which is always between about 230 and 290 millivolts.

On the attached drawing is represented an apparatus adapted for the oxidation of the thiourea according to the process of the invention. This drawing shows the vat containing the solution or suspension of thiourea. The vat is fitted with a jacket for circulating a cooling fluid, maintaining the temperature of the suspension or solution below the room temperature.

The gas containing ozone or ozonized air is supplied by a pipe plunging into the solution or suspension of thiourea.

The reaction medium is agitated by a stirrer.

A platinum electrode in the form of a plate is also represented which is connected to a plot of a potentiometer. The other plot of the potentiometer is connected to a reference electrode (calomel electrode) which is itself in contact with the reaction medium by a siphon pipe.

The following examples illustrate respectively the process carried out by batch methods, in the first case in water medium, and in the second case in organic liquid medium. These examples are illustrative and do not constitute the limitation on the generality of that which is stated elsewhere herein.

*Example 1*

A solution containing 400 grms. of water, 40 grms. of thiourea, and 8 grms. of thiourea dioxide, the latter having been introduced from a prior manufacture, is mixed with about 700 liters per hour of oxygen, as it issues from an ozonizer. This gas contains 50 to 60 mgrms. of ozone per liter. The gas has been cooled to 10° C. The solution of thiourea is maintained at a temperature between 1° and 3° C. by heat exchange. The operation is controlled by measuring the potential existing between a platinum electrode plunged in the solution and a calomel reference electrode. At the beginning of the reaction, the potential is about 100 millivolts. The current of gas is bubbled through the reaction mass until the potential has attained a maximum value, between 230 and 290 millivolts. At that time the input of gas was stopped. The solution was filtered and dried and 44 grms. of thiourea dioxide were obtained in a pure state, representing a yield of 77% with respect to the thiourea in the reaction mass. The mother liquor, which retained 8 grms. of thiourea dioxide in solution, was used in a subsequent operation by dissolving therein an additional quantity of thiourea and subjecting it to the same oxidation. It is to be understood that it is possible to use other means well known for controlling the value of the potential of the oxidation-reduction. For example, it is possible to use a polished gold plate associated with a glass electrode plunged in a buffer system of known pH, the optimum value of the potential being easy to determine experimentally in each case.

*Example 2*

This example employs a non-aqueous reaction medium.

Into a liter of acetone there was introduced thiourea until about 5% by weight of the acetone had been accepted. The thiourea did not entirely dissolve but remained partially in suspension, which presented no difficulties. The thiourea which did not dissolve in the beginning, dissolved as the reaction proceeded. The acetone solution was maintained between −5° and −10° C., by heat exchange. Into this solution there was passed, over a period of about 2 hours, ozone which was obtained by passing oxygen at a rate of 36 liters an hour through an ozonizer functioning under 110 volts with an intensity of .5 ampere. After 2 hours of the introduction of the ozone to the reaction mass, the operation was stopped and the thiourea was separated out by filtration. The yield was 89.3%, of that theoretically possible.

As a result of this process the difficulties of the prior art have been overcome. It is no longer necessary to use the liquid, oxygen-containing reactant. In this invention the thiourea dioxide is made by passing a gas containing ozonized air or ozone into a solution or a suspension of thiourea in an inert liquid which may be either a solvent or a suspension medium for thiourea. The medium is preferably not a solvent for the thiourea dioxide. When the process is carried out by discontinuous or batch methods, every operation is stopped when the potential measured between and electrode plunged into the reaction medium and a reference electrode has attained a maximum value and commences to decrease. When carried out continuously one maintains the said potential at a value corresponding to a maximum yield of thiourea dioxide, by appropriately regulating the amounts of oxidizing gas and thiourea which are added to the reaction mass. Good operating conditions are obtained when the introduction of about 1 kgm. of ozone per hour for every 10 liters of useful capacity of the receptacles containing the liquids is the order, it being provided that the liquids should contain at least the quantity of thiourea which is capable of reacting with the ozone.

What is claimed is:

1. The method of making thiourea dioxide that comprises admixing continuously with an inert liquid reaction medium a gas containing ozone as an essential ingredient, and thiourea, said thiourea being in proportion such that the reaction medium contains permanently at least the quantity of thiourea corresponding to the ozone present in the reaction medium, at a temperature below 20° C.

2. The method of making thiourea dioxide comprising admixing continuously in an aqueous inert liquid reaction medium saturated with thiourea dioxide a gas comprising ozone as an essential ingredient, and thiourea, said thiourea being in proportions such that the reaction medium contains permanently at least the quantity of thiourea corresponding to the ozone present in the reaction medium, at a temperature below 20° C., and isolating the thiourea dioxide.

3. The method of making thiourea dioxide that comprises mixing a gas containing ozone as an essential ingredient with an inert organic liquid medium containing thiourea, in which thiourea dioxide is insoluble, at a temperature below 20° C.

4. The method of claim 2 in which the rate of supply of the ozone containing gas corresponds to the introduction of 1 kg. of ozone per hour for every ten litres of the reaction medium.

5. The method of claim 3 in which the organic medium is acetone.

References Cited in the file of this patent

UNITED STATES PATENTS

| | | |
|---|---|---|
| 1,477,805 | Bedford | Dec. 18, 1923 |
| 2,650,256 | Lingane | Aug. 25, 1953 |

OTHER REFERENCES

Weyl: Chemiker Zeitung, vol. 25, page 292 (1901).